United States Patent [19]

Growe et al.

[11] 4,181,745
[45] Jan. 1, 1980

[54] METHOD FOR DECORATING THE SHELLS OF EGGS

[76] Inventors: Glen H. Growe, 2101 Kenwood Pkwy., Minneapolis, Minn. 55405; Michael P. Patterson, 1425 Maricopa Dr., Oshkosh, Wis. 54901; David C. Egberg, 1271 Robin La., New Brighton, Minn. 55112

[21] Appl. No.: 866,356

[22] Filed: Jan. 3, 1978

[51] Int. Cl.² ............................ A23L 1/27; A23L 1/32
[52] U.S. Cl. .................................. 426/250; 426/540; 426/614; 426/383; 426/289; 426/298
[58] Field of Search ............... 426/250, 540, 614, 104, 426/801, 383, 289, 298, 290; 8/8

[56] References Cited

U.S. PATENT DOCUMENTS

| | | | |
|---|---|---|---|
| 1,318,109 | 10/1919 | Ries | 426/540 |
| 2,052,175 | 8/1936 | Haurand | 426/540 |
| 2,074,376 | 3/1937 | Dorcey | 426/298 |

Primary Examiner—Jeanette M. Hunter
Attorney, Agent, or Firm—James R. Cwayna

[57] ABSTRACT

A process for dyeing the shells of eggs by applying a dry granular dyeing medium to the hydrated shell. The dyeing medium includes dye and rock salt. The shell may be wetted in whole or in part prior to applying the dyeing medium with water or vinegar. The process may be done in a plastic bag or by sprinkling the dyeing medium onto the wetted shell.

13 Claims, 3 Drawing Figures

METHOD FOR DECORATING THE SHELLS OF EGGS

FIELD OF THE INVENTION

This invention relates generally to the dyeing of objects having a normally impervious surface such as eggs and more particularly to the dyeing of eggs wherein the dyeing material is provided in a dry, granular form and is applied to the wetted surface of the egg.

BACKGROUND AND OBJECTS OF THE INVENTION

The use of decorated and decorative eggs for various festive occasions is well known in the art. The most common useages of such eggs are in connection with Christmas and Easter.

Various methods and apparatus for the decoration of such eggs are well known in the art. Such known methods and apparatus include waxing of selected portions of the egg such that dyes will not effect the surface and thereafter removing portions of the wax to allow additional colors to be applied to the, now, unwaxed portions. Perhaps the best known of such a method is what is referred to as Ukranian egg dyeing. This method is extremely tedious but does result in extraordinary patterns.

Another method for dyeing of eggs is to immerse the same in an oil base, multi-color medium which is floated upon water and as the egg passes through this solution, the egg is coated in a random design.

Another more common method is the simple dip process. In this method the egg is hard boiled and a liquid dye solution is prepared and the egg is simply immersed in the solution until the proper color is achieved. The waxing of portions of the egg will result in desired patterns.

Still another method for coloring eggs consists of a mechanical device in which the eggs are rotatably mounted and colored pens are used to draw upon the surface. These pens are normally mechanically mounted and guided.

With the invention as disclosed herein a simple arrangement for the coloring of eggs is provided. The system includes the use of dry coloring agents, thus eliminating a liquid solution, and in the preferred form of the invention, a receptacle for retaining the agent and capable of receiving the egg such that the entire coloring process may be completed within the receptacle. This self contained process eliminates the necessary clean up usually associated with the other methods.

It is therefore an object of applicants' invention to provide the method and material for the coating of objects wherein the dyeing material is provided in granular form and is evenly distributed over the surface of the article to be coated.

It is a further object of applicants' invention to provide the material and method for the coating of objects wherein the dyeing medium is provided in granular form and is provided within a receptacle and the object to be coated is placed therein and the receptacle is thereafter agitated to insure the proper distribution of the dyeing material upon the surface of the object.

It is still a further object of applicants' invention to provide the method and material for the coating of objects such as eggs wherein a granular dyeing material is provided and means are provided to insure the covering of the egg.

It is still a further object of applicants' invention to provide the method and material for the coating or dyeing of the shells of eggs wherein the dyeing medium is provided in a granular form and is carried by an edible material.

It is yet a further object of applicants' invention to provide the process for producing a dyeing agent in a granular form which will be activated upon contact with the wetted surface of an egg or similar object and will adhere thereto and provide the dyeing or coloring reaction as desired.

These and other objects and advantages of applicants' invention will more fully appear from the accompanying drawings and disclosure wherein the same numeral is utilized to designate the same or similar elements throughout the several views, and in which.

In accordance with the accompanying drawings, applicants' method and material is illustrated in a manual operation for the coating or dyeing of an object such as an egg E. The preferred form of the invention is illustrated in FIG. 1 and although this disclosure is directed to a manual coating operation, it should be obvious that at least certain of the steps and procedures to be disclosed herein could be performed with mechanical systems or that certain of the articles as disclosed herein could be modified without departing from the scope of the invention.

Figure 1:
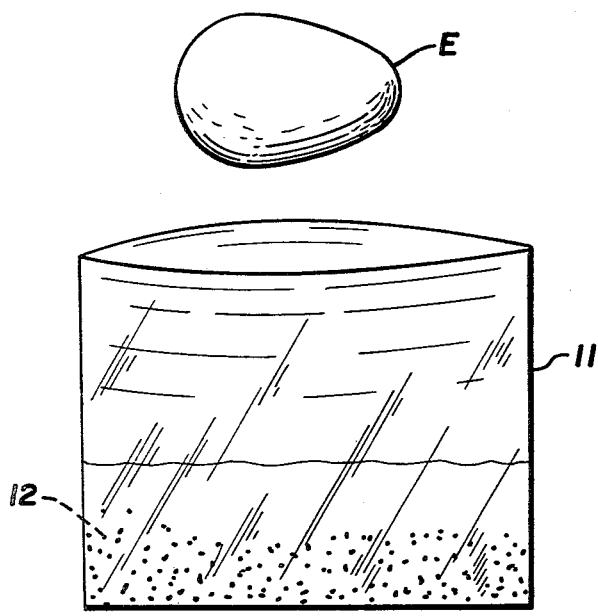
FIG. 1 is an illustration of a flexible receptacle containing the granular dyeing agent and illustrating an egg is position to be received therein.
Figure 2:
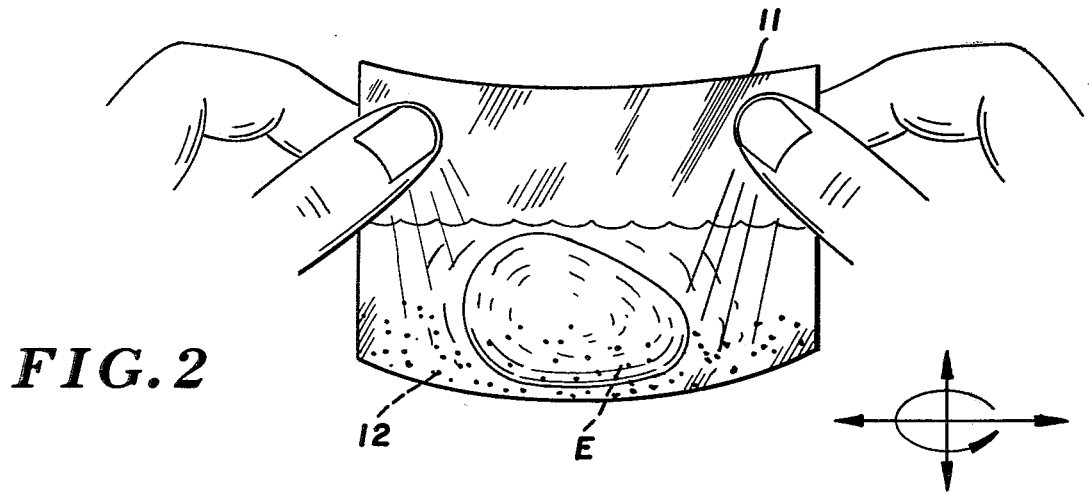
FIG. 2 is a view similar to FIG. 1 in which the egg or object to be dyed or coated is illustrated as having been placed in the receptacle and the same is illustrated as being manually agitated to in sure covering of the egg with the granular material; and, FIG. 3 is a block diagram illustrating the method of preparing the dyeing medium of applicants' invention.

As illustrated in the preferred form of the invention in FIGS. 1 and 2, a receptacle 11 is provided to hold a quantity of the dyeing medium 12. The receptacle 11, in the form shown, consists of a flexible bag of a sufficient size to easily receive and retain a quantity of the dyeing medium and an egg and allow the egg to be shifted within the receptacle upon agitation of the same. This agitation and shifting will provide total and proper coating of the egg. Applicants' have also found that a bag of clear material will allow viewing of the process and in addition to this concept, the use of a clear plastic bag will lend itself to ease of cleaning and reuse. A self closing bag or a bag that has sufficient flexibility to be closed by a persons fingers will be most beneficial and will serve to conserve the dyeing medium.

When the egg is placed into the receptacle, either the entire surface thereof or selected portions of the surface are wetted. Wetting the entire surface will result in coating or dyeing the entire surface of the egg and the selected wetting will result in a desired pattern coating. This wetting and the agents therefore will be discussed hereinafter. After observing that the egg has been given the desired coating by agitation or movement of the receptacle, the egg is removed and allowed to dry.

It should be obvious that the wetting of the surface not only causes adherence of the dyeing medium but also activates the same such that it will properly color the surface.

Although it may be assumed that a single color is provided in a receptacle, it should be obvious that colors may be mixed to achieve various effects.

A second form of the invention is also within the scope of this invention but no drawings are utilized therefore as no particular structural considerations are believed to be necessary to practice this technique. In this form, the surface of the egg is wetted and the dyeing medium is sprinkled thereover. This sprinkling may be easily accomplished manually or and article such as a salt shaker could be utilized. With this form of the invention a speckled pattern may be introduced onto the egg or entire coverage may be achieved. The obvious disadvantage of this method is the necessary clean up and the loss of medium.

The wetting of the surface of the egg has been mentioned. With the dyeing medium as disclosed hereinafter, the activating wetting agent is preferably water but applicants' are aware of dyeing agents that may be powderized or pulverized into the proper granular form but which require wetting with vinegar to activate the dyeing medium. It should be noted that disclosure relates to and includes granular materials and is not necessarily limited to the specific dyeing medium as disclosed hereinafter.

Figure 3:
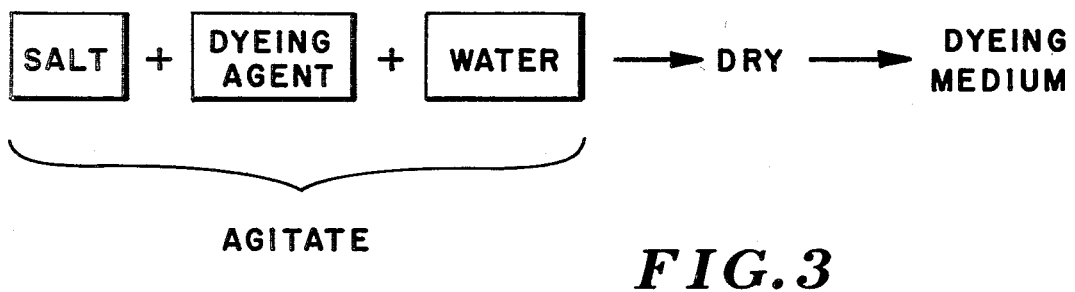

The method for providing applicants' dyeing medium with water available as the hydration or activating agent is illustrated in FIG. 3.

As will be discussed the original dyeing agents used in applicants' formulation are those that are approved for use in and for articles approved for human consumption. The designations used for the individual dyeing agents are simply the Food and Drug Commission numerals.

The preparation of the basic dyeing medium includes the initial blending of rock salt in what is commonly known as a ribbon blender and this blending provides a finely pulverized medium to which the required amount of the selected dyeing agent is provided. This dry mixture is again blended to insure proper mixing of the two dry ingredients. After such proper mixing, a quantity of liquid is added and the agitation is continued until the color is evenly and thoroughly distributed. The resulting mixture is then placed in drying pans and is heated to insure thorough drying.

Although it should be obvious that various colors may be arrived at by providing combinations of various of the basic F & DC dyeing agents and that lighter hues may be provided by decreased quantities of a selected dyeing agent, the applicants' have provided herein a selection of random colors to obtain the designations of colors they have labelled. For each such designation, the applicants' are providing the basic formulations for 1000 lb. quantities. In each formulation the basic ingredient is 1000 lbs of rock salt and 10 liters of water. Mixing times at each step, the addition of the dyeing agent and the water is from 10 to 15 minutes dependent upon the resistance of the salt to proper pulverization. The heating or dehydration is normally accomplished at 250° F. within a 60 minute period. To the initial salt, the applicants provide the following dyeing agents to achieve the following colors:

| Light Pink | 1800 grams FDC Red #3 |
| Dark Pink | 2370 grams FDC Red #3 |
| Orange | 7100 grams FDC Yellow #6 |
| Blue | 533 grams FDC Red #3 |
| | 1067 grams FDC Blue #1 |
| Light Green | 1420 grams FDC Blue #1 |
| | 2130 grams FDC Yellow #5 |
| Dark Green | 1892 grams FDC Blue #1 |
| | 2838 grams FDC Yellow #5 |

As stated, the designations of colors are those that are defined by the applicants and anyone practicing the teachings hereof must be aware that variations may result simply from a difference of interpretation.

With these basic colors, the applicants have provided additional mixtures to achieve various results. Obviously various combinations of these basic colors will result in different shades of the listed colors but with these basic color combinations sufficient teaching is available to provide colors to numerous to illustrate. The basic teaching permits either the use of the colors as provided or allows for mixing thereof.

It should be obvious that applicants have provided a new teaching for the decoration of various objects and particularly eggs. The application of the dry dyeing medium, whether requiring activation by water or other mediums provides a new and unique concept and this concept in combination with the receptacle for retaining the dyeing medium provides patentably meritable distinctions over the prior art as the same is understood.

What we claim is:

1. The method for dyeing the shells of eggs, comprising:
   a. preparing a dyeing medium in a dry, granular form, said medium comprising salt and a dyeing agent;
   b. wetting at least selected portions of the shell with a hydration agent, selected from the group consisting of water and vinegar in proportions sufficient to activate the dyeing agent; and,
   c. applying said dyeing medium to the wetted areas of the shell.

2. The method for dyeing as set forth in claim 1 and wetting the entire surface of the shell to obtain total dyeing coverage thereof.

3. The method as set forth in claim 1 and said dyeing medium being sprinkled over the wetted areas of the shell.

4. The method as set forth in claim 1 wherein said hydration agent is vinegar.

5. The method as set forth in claim 1 wherein said hydration agent is water.

6. The method as set forth in claim 1 wherein said dyeing medium is in a receptacle of a predetermined size and placing the egg in said receptacle.

7. The method as set forth in claim 6 and the step of agitating said receptacle whereby said dyeing agent will contact the surface of the egg.

8. The method as set forth in claim 6 and said receptacle is a flexible bag.

9. The method as set forth in claim 6 wherein said receptacle is a transparent bag.

10. The method as set forth in claim 6 and said receptacle is a self closing bag.

11. The method as set forth in claim 1 wherein the salt is rock salt.

12. The method as set forth in claim 1 wherein said dyeing medium is provided by forming a mixture of a dyeing agent, salt and water, mixing the same and thereafter drying the same.

13. The method as set forth in claim 12 further including:
   a. mixing and pulverizing rock salt;
   b. adding the dyeing agent to the pulverized rock salt and mixing the same;
   c. adding water to said salt and dyeing agent mixture while continuing to mix; and,
   d. drying the resulting mixture thereby forming said dyeing medium.

* * * * *